3,579,390
METHOD OF MAKING A CERMET
T. O. Paine, Acting Administrator of the National Aeronautics and Space Administration, with respect to an invention of Alexis I. Kaznoff, Castro Valley, and Mickey O. Marlow, Livermore, Calif.
No Drawing. Filed Dec. 20, 1968, Ser. No. 785,780
Int. Cl. C21d 1/00
U.S. Cl. 148—126                                   6 Claims

ABSTRACT OF THE DISCLOSURE

A cermet in which ceramic particles dispersed in a metal matrix are uncoupled therefrom. The cermet is made by pressing metal coated ceramic particles in a die at a temperature sufficient to cause bonding of the metal coatings to one another. The cermet is then heat treated to mechanically uncouple the ceramic particles from the metal matrix whereby expansion of the cermet when heated is substantially the same as that of the metal matrix.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates to cermets for nuclear fuel and to a method for making same.

In general, a cermet is a refractory composition comprising a metal matrix having grains of material such as ceramics, metal carbides, nitrides, or silicates dispersed therein.

Cermets used as nuclear fuel are subjected to extremely high temperatures and corrosive environments. Consequently, a cladding or layer of material resistant to corrosion at high temperatures is often applied to nuclear fuel cermets. However, a problem arises in that a cladding material which has a thermal coefficient of expansion the same as or close to the coefficient of thermal expansion of the cermet matrix material will be subject to undesirable destructive stresses because the thermal coefficient of expansion of the cermet lies somewhere between the coefficients of expansion for the matrix material and the ceramic grains dispersed therein.

Accordingly, it is an object of the invention to provide a cladded cermet in which the cladding is not subjected to disruptive stresses.

It is another object of the invention to provide a cermet which is dimensionally stable when subjected to thermal cycling.

Still another object of the invention is to provide a cermet having a thermal expansion substantially the same as that of the matrix material.

Other objects and advantages of the invention will become apparent from the following description.

DESCRIPTION OF THE INVENTION

In accordance with usual engineering practice, the matrix material of a nuclear fuel cermet is a nonfissionable metal having good heat conductivity while the ceramic grains or particles are a fissionable material. While it is desirable that the cermet contain a high percentage of ceramic material, sufficient metal must be present to provide ample heat conductivity. In a cermet constructed in accordance with the invention, the ceramic material is present in a range of from 30% to 90% of the volume of the composition of the cermet.

Suitable materials for the matrix of the cermet include beryllium, chromium, chromium-nickel alloys, iron, molybdenum, nickel, niobium, stainless steel, tantalum, or tungsten. The ceramic material to be used is selected from a group which includes the dioxides, sulfides, nitrides, and carbides of uranium or plutonium or a mixture of any combination.

In accordance with the invention, at least two sizes of ceramic particles are coated with a refractory metal selected from the group of metals listed above as suitable matrix materials. The diameter of the smaller ceramic particles lies in a range of from 10 to 100 microns while the diameter of the larger ceramic particles falls within a range of from 50 to 500 microns. In order to achieve a packing density of 83% to 85%, the preferred size ratio of the larger of the ceramic particles to the smaller is approximately 10 to 1.

To the end that the ceramic material will make up from 30% to 90% of the volume of the cermet, the thickness of the refractory metal coating on the small ceramic particles ranges from 0.2 to 12 microns and on the large particles from 1 to 210 microns. The ceramic particles should have at least 22% entrapped porosity.

The two sizes of coated ceramic particles are mixed together, the smaller coated particles making up from about 30% to about 90% of the mixture. The mixture is loaded into a die configurated to produce a cermet body of desired shape and dimensions. The mixture is then hot compacted by subjecting it to a pressure of 2000 pounds or more per square inch while it is heated to a temperature great enough so that the metal coating on the ceramic particles will bond together forming a solid metal matrix. It will be understood by those skilled in the art, that isostatic hot pressing may be used for this step. The temperature at which hot compaction is carried out ranges from about ½ to ⅘ of the melting temperature of the particular metal with which the ceramic particles are coated. After the hot compacting step, plastic deformation of the ceramic particles is only 15% to 17% and about 5% to 7% porosity is retained in each ceramic particle.

After the hot compacting is completed, the cermet is heat treated at a temperature in the range between 1200° to 2000° C. The 5% to 7% porosity remaining in the ceramic particles after the hot compacting step is moved to the interface between the ceramic particle and the metal matrix by the heat treatment. This uncouples the ceramic particles from the matrix and provides sufficient volume to accommodate thermal expansion of the ceramic particles in their own respective cells in the matrix. As a result, the thermal expansion of the composite cermet body is uneffected by the expansion by the ceramic particles. Accordingly, the expansion of the cermet body in substantially the same as would result if the cermet were a body made wholly of the matrix metal. The cermet produced by the foregoing method may now be cladded with the same metal used for the cermet matrix or a metal having approximately the same thermal coefficient of expansion without the coating being subjected to destructive stresses which would otherwise occur when thermal cycling takes place.

It will be understood that the above described cermet and method may be changed or modified without departing from the spirit and scope of the invention as set forth in the claims appended hereto.

What is claimed is:
1. A method of making a cermet comprising the steps of:
  applying a coating of metal to a first size of ceramic particles;
  applying a coating of said metal to a second different size of ceramic particles;

forming a mixture of said first and second sizes of ceramic particles;

compacting said mixture at a pressure and a temperature sufficient to cause said metal coated ceramic particles to bond together forming a continuous metal matrix having said ceramic particles dispersed therein; and heat treating said cermet at a temperature of from about 1200° C. to about 2000° C. to uncouple said ceramic particles from said metal matrix.

2. The method set forth in claim 1 wherein the diameter of said first size of particles is in a range of from 50 to 500 microns and the diameter of said second size of particles is in a range of from 10 to 100 microns.

3. The method of claim 1 wherein the metal coating applied to the first size of particles has a thickness in a range of from 1 to 210 microns and the metal coating applied to the second size of particles has a thickness in a range of from 0.2 to 12 microns.

4. The method of claim 1 wherein said compacting pressure is at least 2000 pounds per square inch.

5. The method of claim 1 wherein the compacting temperature is in a range of from ½ to ⅘ the melting temperature of the metal coating on the ceramic particles.

6. The method of claim 1 wherein each ceramic particle has a porosity of at least 22%.

References Cited
UNITED STATES PATENTS

| | | | |
|---|---|---|---|
| 2,853,401 | 9/1958 | Mackiw | 75—212X |
| 3,019,103 | 1/1962 | Alexander | 75—212X |
| 3,290,144 | 12/1966 | Iler | 75—212X |
| 3,343,953 | 9/1967 | Schladitz | 75—212X |

CARL D. QUARFORTH, Primary Examiner

A. J. STEINER, Assistant Examiner

U.S. Cl. X.R.

29—182.5; 75—201, 205, 206, 264—.5